United States Patent [19]
Fattinger

[11] 3,925,040
[45] Dec. 9, 1975

[54] GAS SCRUBBING PLANT
[75] Inventor: Volker Fattinger, Arlesheim, Switzerland
[73] Assignee: Ciba-Geigy Corporation, Ardsley, N.Y.
[22] Filed: May 9, 1974
[21] Appl. No.: 468,786

[30] Foreign Application Priority Data
May 14, 1973 Switzerland.................... 6808/73

[52] U.S. Cl. .............. 55/257; 55/440; 55/443; 55/84; 261/108
[51] Int. Cl.² ............................ B01D 47/00
[58] Field of Search ........... 55/257, 440, 442, 443, 55/444, 464, DIG. 37, 434, 445, 446, 97, 258, 463, 84; 261/108; 98/121 R

[56] References Cited
UNITED STATES PATENTS

| | | | |
|---|---|---|---|
| 808,897 | 1/1906 | Carrier | 55/257 |
| 1,616,802 | 2/1927 | Hosch | 55/464 X |
| 1,948,363 | 2/1934 | Taylor | 55/440 X |
| 1,956,591 | 5/1934 | Gies | 55/440 X |
| 2,752,005 | 6/1956 | Avera et al. | 55/436 X |
| 3,338,035 | 8/1967 | Dinkelacker | 55/440 X |

FOREIGN PATENTS OR APPLICATIONS

| | | | |
|---|---|---|---|
| 840,737 | 5/1934 | France | 55/434 |
| 107,134 | 3/1927 | Austria | 55/440 |
| 828,547 | 12/1969 | Canada | 55/440 |

*Primary Examiner*—Frank W. Lutter
*Assistant Examiner*—David L. Lacey
*Attorney, Agent, or Firm*—Harry Falber; Frederick H. Rabin; Karl F. Jorda

[57] ABSTRACT

In a gas scrubbing plant comprising a scrubbing station upstream of a drop trap for separation of scrubbing liquid, said drop trap comprising a plurality of vertical plates extending substantially parallel to one another and defining horizontal gas flow passages therebetween, said plates each having a zig-zag horizontal section, and each passage having at least two angled bends therein, the plates are shaped to form a pocket on the outer side of each bend extending on both sides of the corner of the bend and substantially over the entire height of the respective plate; the plates are also shaped prior to each bend to at least partially guide the gas flow into the associated pocket; and the angle of the first of said bends is greater than the angle of the second of said bends immediately downstream of it.

8 Claims, 3 Drawing Figures

GAS SCRUBBING PLANT

BACKGROUND OF THE INVENTION

This invention relates to a type of gas scrubbing plant comprising at least one scrubbing station upstream of at least one drop trap for separation of scrubbing liquid, said drop trap comprising a plurality of vertical plates extending substantially parallel to one another and defining horizontal gas flow passages therebetween, each said passage having at least two angled bends therein.

Drop traps are used to separate liquid from a current of gas, said traps consisting essentially of parallel plates mounted at varying distances from one another. The plates are corrugated or bent in zig-zag fashion and form between them straight and angled flow paths through which the gas flows horizontally. If the speeds of flow are high enough, relatively large centrifugal forces act on the liquid particles of higher specific gravity in the gas in the angled bends, and such forces urge the liquid particles to the walls of the flow paths, where they can flow down vertically.

It has been found in practice that although it is nearly always possible for the liquid droplets entrained in the flow of gas to be brought up to the boundary wall of the passages, the particles do not simply flow down there but in some cases rebound from the walls directly back into the flow of gas or are entrained by the relatively fast flow of gas as they move down.

BRIEF DESCRIPTION OF THE PRIOR ART

To obviate these disadvantages it has already been proposed to use drop traps which have trap pockets at the walls of the passages in or after the bends thereof, the liquid droplets being intended to flow into said pockets. Since the unimpeded widths of the passages must be relatively small to obtain a high degree of separation, the trap pockets can only be made relatively small. Consequently, however, the trap pockets can accommodate only a small amount of liquid and therefore their bottom zone is usually over-filled so that the liquid droplets there may pass back into the flow of gas. Also, most gases are always somewhat contaminated, so that the trap pockets clog relatively rapidly and thus become inoperative.

It has already been proposed to provide the plates with recesses downstream of the bends, so that the flow of gas does not directly reach the plates there. It has been found, however, that the droplets cannot flow away as well as was expected in these "dead" recesses. Such drop traps do not satisfy the requirements made of them, particularly when relatively high gas throughputs are required.

Drop traps with corrugated plates are also known, In addition, the plates have a corrugated fluting which is either distributed over the entire plate length or is confined just to the transitional zones between any two bends. Known drop traps of this kind have an adequate efficiency only if the material from which the plates are made, or at least the surface thereof, has satisfactory wettability to the liquid to be separated, so that the liquid can form a cohesive film on the plate surface. Otherwise, the liquid droplets are either thrown back into the gas flow when they rebound from the plates, or are driven out of the grooves as they descend and are re-entrained. With such a drop trap, therefore, there is the disadvantage that the materials which can be used are considerably restricted.

The object of the invention is to improve a gas scrubber plant of the type described in the introduction, so that very high gas throughputs can be obtained and the liquid particles entrained in the flow of gas can be separated with very high efficiency without there being any clogging or other undesirable side-effects, and particularly without there being any limitation to specific construction materials.

SUMMARY OF THE INVENTION

The invention provides a gas scrubbing plant of the above described type with a drop trap wherein:

the plates are shaped to form a pocket on the outer side of each bend extending on both sides of the corner and substantially over the entire height of the respective plate;

the plates are also shaped prior to each bend to at least partially guide the gas flow into the respective pocket; and wherein the angle of the first of said bends is greater than the angle of the second of said bends immediately downstream of it.

The invention also relates to a method of operating the new gas scrubbing plant. The method of operation is characterised according to the invention in that the liquid content of the gas flow is adjusted to at least 3 g/m$^3$, preferable 500 g/m$^3$ and more before the gas enters the drop trap. According to a preferred variant of the method, the gas flow moisture content is so adjusted that most of the moisture consists of drops whose falling speed in the stationary gas is between 8 and 200 cm per second.

BRIEF DESCRIPTION OF THE DRAWINGS

One exemplified embodiment of the scrubber plant according to the invention will be explained in detail hereinafter with reference to the accompanying drawings and the method of operation will be explained. In the drawings.

DESCRIPTION OF THE PREFERRED EMBODIMENT

Figure 1:
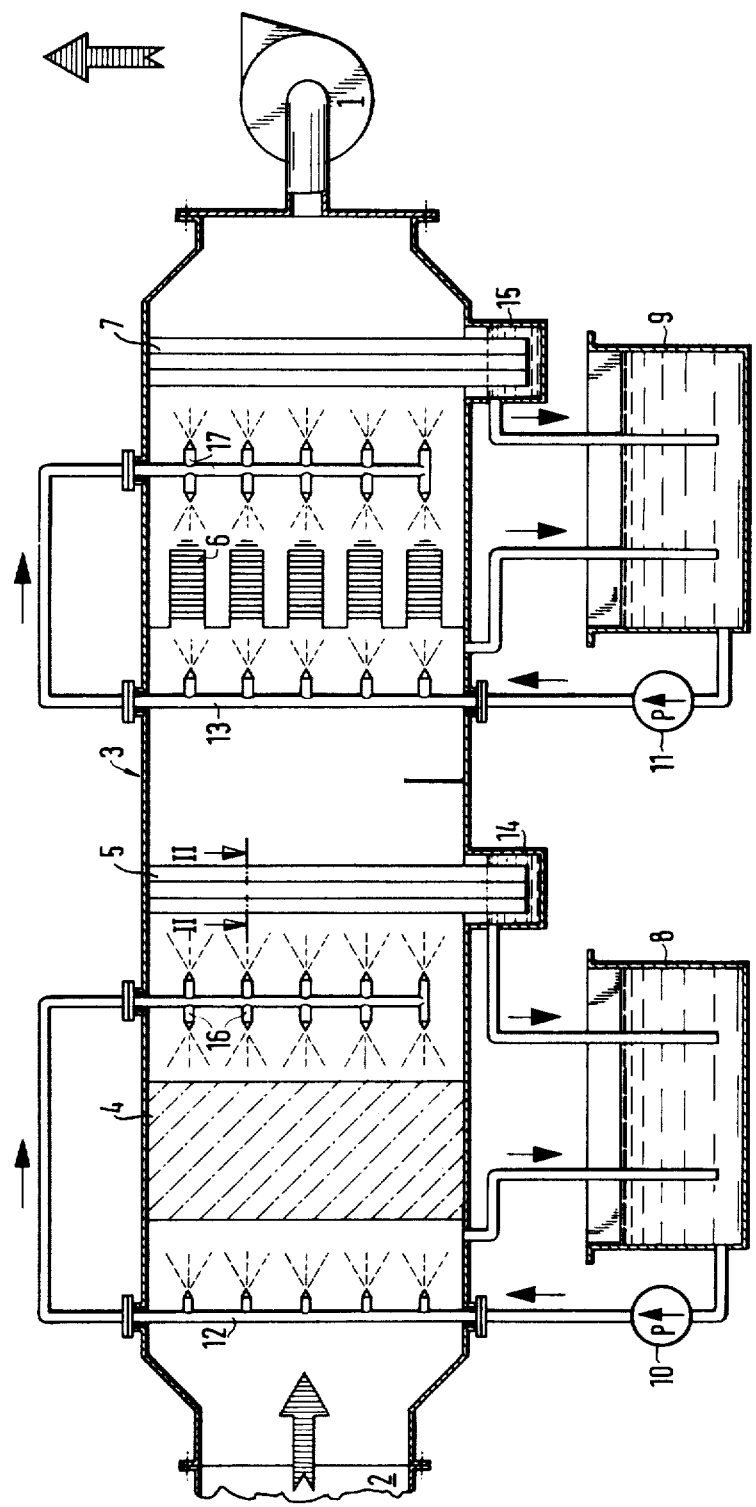
FIG. 1 is a diagrammatic elevation of a scrubbing plant of two-stage construction.

The gas for scrubbing is drawn in by a fan 1 and passes through inlet aperture 2 into a scrubbing plant 3. After the gas has passed through a first scrubbing station with a contact zone 4, in which there is mass transfer from the gas stream to the scrubbing medium, it passes to a first drop trap 5 where the entrained scrubbing liquid particles are separated. From there the gas is passed to a second scrubbing station with a contact zone 6 where another constituent is washed out by means of another scrubbing liquid. The liquid particles entrained at this station are then separated in a second drop trap 7, so that finally the purified gas can be discharged by means of the fan.

The scrubbing liquids, which are stored in tanks 8, 9 respectively, are supplied by pumps 10, 11 respectively to spraying devices 12, 13 respectively in front of the respective contact zones 4, 6, and after separation in the drop traps pass in the direction of the arrows back to the respective tanks via collecting ducts 14, 15 respectively disposed beneath the drop traps.

Of course a single scrubbing station might be sufficient in some cases, just as it may be necessary to have even more such stages. The principle, however, remains the same.

Figure 2:
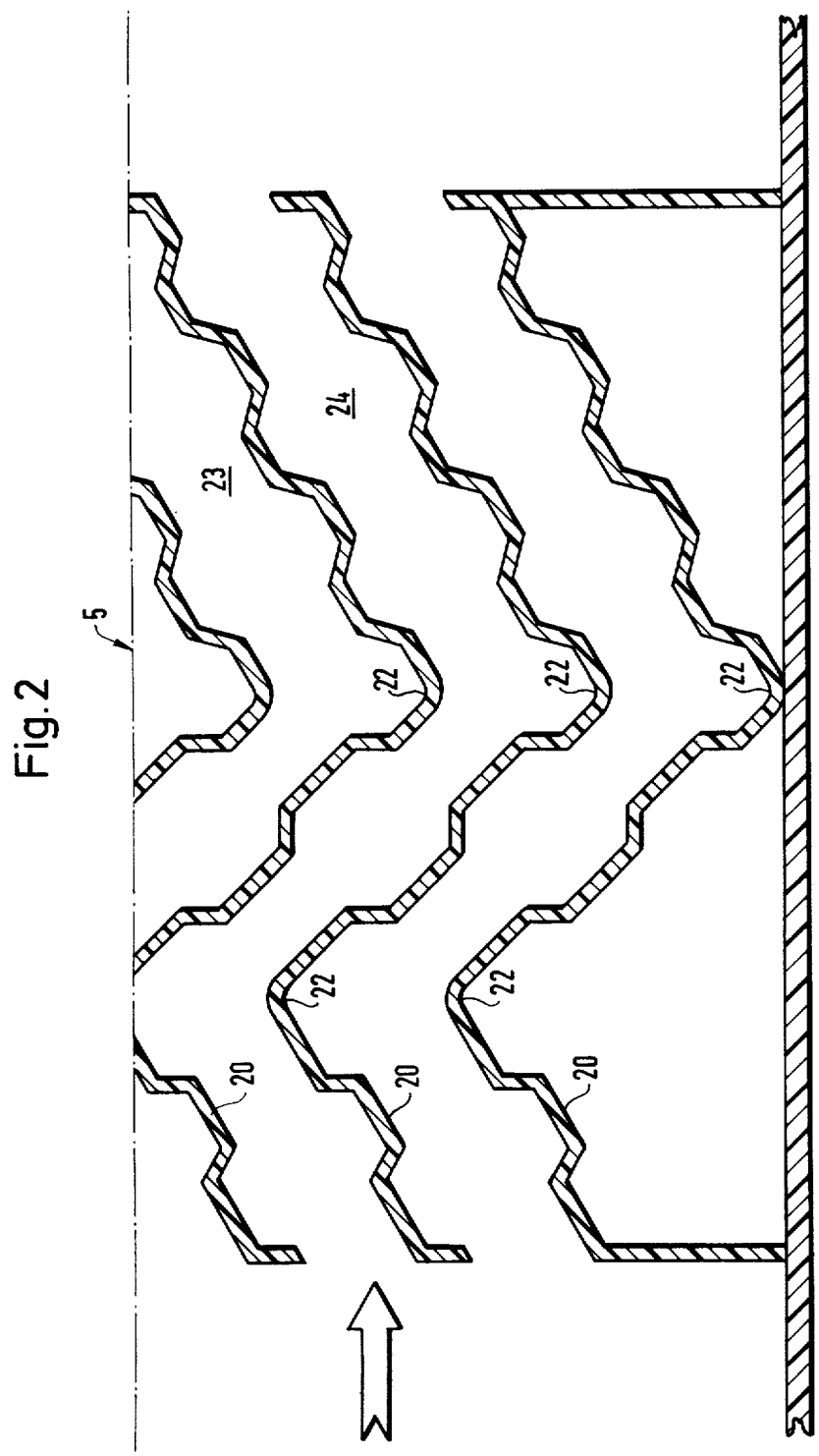
FIG. 2 is an enlarged section on the line II—II in FIG. 1.

FIG. 2 is a horizontal section through the drop trap on an enlarged scale. As will be seen from the drawing, the drop trap consists essentially of vertical plates 20 which are bent in zig-zag fashion, sharply angled flow passages through which the gas has to flow horizontally being formed between each pair of plates for the gas from which the liquid droplets are to be removed.

At their top ends, the plates 20 are suspended from a bearer frame (not shown) and are kept in accurately defined spaced relationship by supporting means (not shown). The foot ends of the plates project into the collecting ducts 14, 15. All the plates are of completely identical construction, except that the two outermost plates have additional flanges for spacing in a lateral frame. If the bearer frame and the spacing elements are appropriately constructed, however, it is also possible for the two outermost plates also to be exactly the same as the other inner plates.

Figure 3:
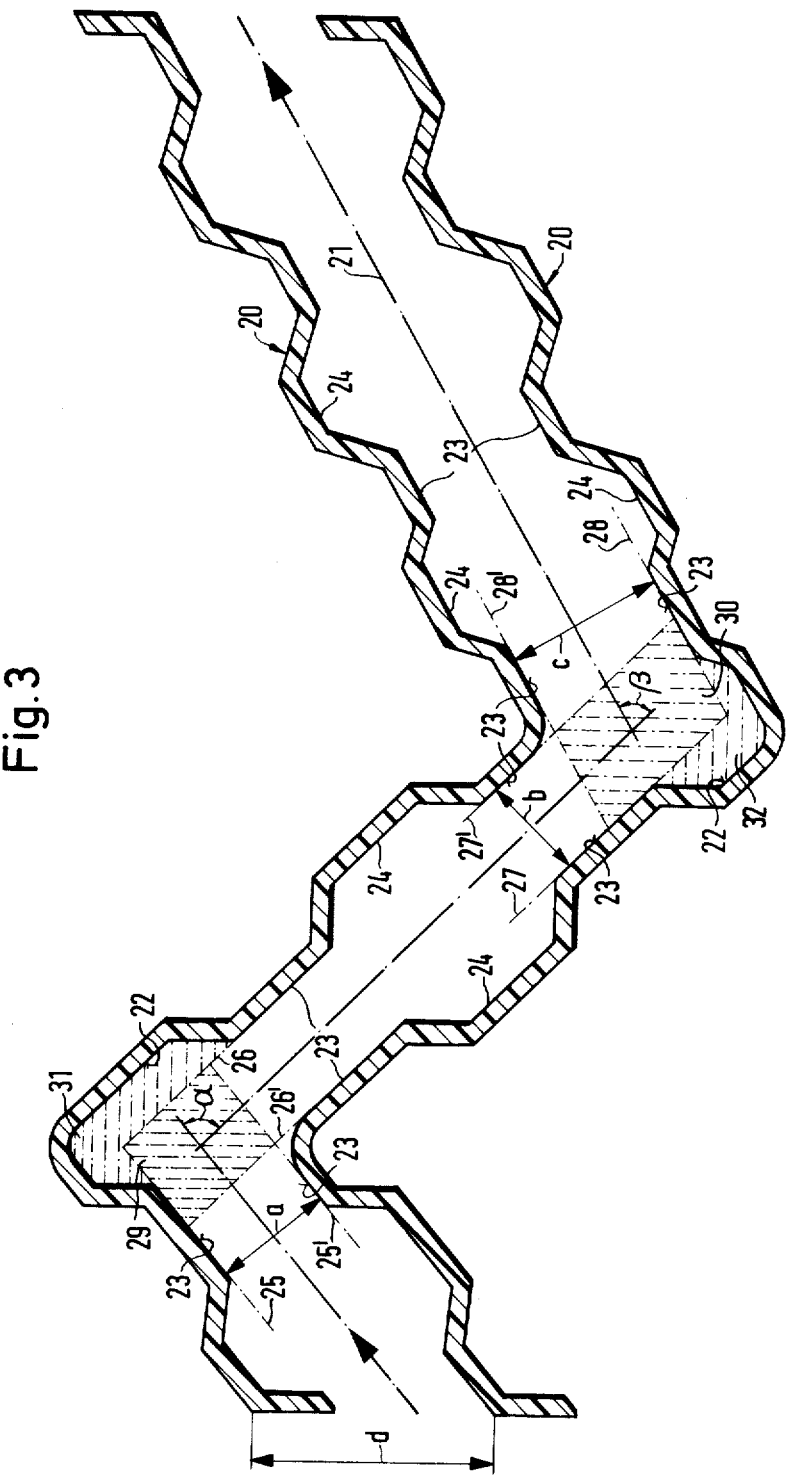
FIG. 3 is a detail of FIG. 2 on a scale of 1:1.

Further details of the plates 20 will be apparent from FIG. 3, which shows two plates on a 1:1 scale. It will be seen that each pair of plates defines a gas flow passage composed of substantially rectilinear portions between each of which there is an angled bend. At these bends the gas stream is deflected relatively abruptly through a relatively large angle. In view of the straight flow portions we may refer to a main direction of flow upstream and downstream of each bend and this is shown by the chain-dotted line 21 in the drawing.

Pockets 22 in the bends are the most important feature of the plates 20. These pockets extend over the entire height of the plates and thus form vertical ducts in which a large amount of the liquid droplets separated from the current of gas can flow off. These pockets 22 are situated only at the outside of the bends. Between the pockets 22, i.e. in front of and after such pockets, each plate has a trapezoidal profile such that the flow path defined by each pair of plates alternately narrows and widens out. A constriction 23 is provided in front of and after each angled bend. The passages also have widened portions 24. Using just a single shape of plate, the special trapezoidal profiling thereof enables the flow passages to narrow and widen out practically without exception symmetrically to the line 21 which also indicates the centre-line between two plates.

Referring to the horizontal section through the drop trap of Fig. 3, there are shown lines 25 and 25' parallel to the direction of flow immediately before the first bend and respectively touching the outer and the inner plates defining the passage immediately before the first bend, while lines 26 and 26' are parallel to the direction of flow immediately after the first bend and touch the outer and inner plates immediately after the first bend. Lines 25, 25', 26, 26' bound a parallelogram 29, and lines 25, 26 and the outside of the outer plate bound the cross-sectional area 31 of pocket 22 of the first bend. Lines 27, 27', 28, 28', parallelogram 30 and cross-sectional area 32 of pocket 22 of the second bend are in similar relationship to the second bend as are lines 25, 25', 26, 26', parallelogram 29 and cross-sectional area 31 to the first bend.

It has been found that in order to obtain a high degree of separation of liquid, the cross-sectional area 31, 32 of each pocket 22 should be at least 8%, and preferably between 30 and 60% of the area of the parallelogram 29, 30 of its associated bend. The pockets must cover the entire bend, i.e. extend on both sides of the corner of the bend, as shown in the drawing.

It will also be apparent from FIG. 3 that prior to each bend the plates are so shaped that the gas stream is guided into the respective pocket. At the first bend practically the entire gas stream enters the pocket, while this is only partly the case at the second bend.

The angled bend on the one hand, and the guidance of the gas stream into the pocket associated with that bend causes the liquid droplets to be brought to the walls of the pockets, and said droplets can then flow down in the ducts formed by the pockets without being entrained again by the gas stream.

For optimum efficiency of the drop trap it is very important that the angle of the first bend is greater than the angles of subsequent bends downstream of it. In most cases the separating effect of the drop trap is such that two bends are quite sufficient for practically complete removal of the droplets from the gas. In cases where this is not sufficient, it is of course possible to use plates providing further bends. In such a case, the angles of the bends after the first may all be of the same size or may advantageously successively decrease. The best results are obtained if the angle $\alpha$ of the first bend is at least 70° and is not much more than 120°. With such an arrangement most of the liquid contained in the gas is then already separated at the first bend so that subsequent bends can be angled much less sharply. Advantageously, the angle of bends downstream of the first is at least 10°, and preferably 15° to 20°, less than $\alpha$. The less sharp downstream bend(s) after the first avoid excessive resistance of the drop trap to flow.

The gas stream acceleration produced by the constrictions in front of each deflection point also contribute to the high efficiency of the drop separator. It has been found advantageous for the inside width of the constriction before the second bend to be less than the inside with $l$ of the constriction before the first bend. It is also advantageous for the inside width $c$ of the constriction after the second deflection point to be greater than that of the two constrictions before the second deflection point. It has been found that a very high separation efficiency can be obtained if the speed of the gas stream in the drop trap is accelerated to about 1.6–3.4 times the speed in front of the same. This can be achieved by appropriate dimensioning and spacing of the plates, since the acceleration depends only on the geometry of the drop trap.

The special shape of the plates gives the drop trap an efficiency such that the plates do not have to be wettable by the liquid which is to be separated. This is of course a considerable advance and advantage. since these plates can now be made of a cheap plastic and the drop trap can be used in a wider range of applications.

It has been found the ultra-fine droplets are very much more difficult to separate from the gas stream than larger liquid particles. When a gas stream has only a relatively low liquid content, only very few of the droplets — which are then very fine — are separated. It has now surprisingly been found that even gas streams having a very low liquid content can have the liquid removed effectively provided that they are additionally charged with the same or another liquid before entry to the drop trap. It is easiest to separate from the gas stream those drops which sink or fall at a speed of between 8 and 200 cm per second in the stationary gas.

The amount of liquid to be additionally injected into the gas stream before it enters the drop trap naturally depends on the type of contact zones in front of the drop trap and on the speed of flow of the gas. If enough drops of the correct size are already present in the gas after the contact zones, the gas can of course be fed directly to the drop trap. Otherwise it is preferable to use pressure atomising nozzles at a pressure of about 2 to 4 bars to inject an amount of scrubbing liquid or water into the gas such as to give a total liquid content of 3 g/m$^3$ to 500 g/m$^3$. Thus is has been found that a total content of 500 g/m$^3$ before the drop trap gives a residual liquid content of less than 5 mg/m$^3$. With a much lower total content of 3 g/m$^3$, the residual liquid content was admittedly somewhat higher but it was still very low, being 20 mg/m$^3$.

In the illustrated embodiment the additional liquid injection in front of the drop trap is provided by the spray devices 16 and 17.

The following example clarifies the outstanding results obtainable with the above-described scrubbing plant.

A venturi scrubber was used as a contact zone in an outgoing air scrubber plant, about 2 liters/m$^3$ of gas being injected. A drop trap of conventional type with trap pockets was originally used to separate the entrained scrubbing medium drops. For a speed of flow of 7 m/sec, based on the free space in the zone in front of the drop trap, quantities of between 150 and 300 mg/m$^3$ of scrubbing medium were still found in the gas stream in front of the blower. The scrubbing liquid content in front of the blower was even higher after some period of operation, when contaminated circulating liquid caused clogging of the fine trap pockets. The spacing between adjacent plates was 20 mm.

The known drop trap was replaced by one of the above-described type together with a spray device in front of it and this gave residual contents of less than 20 mg/m$^3$. There were no longer any interruptions due to clogging of the drop trap. The space d, which determines the number of parallel plates per running metre, was 42 mm and less than half the plates was necessary as compared with known drop traps of conventional construction.

The resistance of the drop trap to flow was equivalent to the pressure of an 18 mm water column. 52 g of liquid per m$^3$ of gas flowed out of the collecting duct. The overall depth of the drop trap in the direction of the gas flow was 23 cm.

The residual content of scrubbing medium in the gas was less than 5 mg/m$^3$ for a speed of flow of 6 m/sec in front of the drop trap. The residual content was less than 50 mg/m$^3$ in the case of a speed of up to 8.5 m/sec.

What is claimed is:

1. A gas scrubbing plant having a gas inlet and gas outlet and further comprising at least one scrubbing station upstream of at least one drop trap for separation of scrubbing liquid, each of said at least one drop trap comprising a plurality of vertical plates extending substantially parallel to one another and defining horizontal gas flow passages therebetween, said plates each having in a horizontal section a zig-zag configuration and each said passage having at least two angled bends therein;

said plates being shaped to form a pocket on the outer side of each bend extending on both sides of the corner of the bend and substantially over the entire height of the respective plate and being positioned prior to each bend such that the passage defined therebetween opens into said pocket for at least partially guiding the gas flow into the associated pocket;

the angle of the first of said bends being greater than the angle of the second of said bends immediately down stream of it, said angles being defined by the juncture of the respective center-lines of the flow passages prior to and after said bends; and the pocket formed in at least a first of said bends in each passage having a horizontal cross-sectional area of at least 8% of the area of a parallelogram associated with said first bend, the parallelogram being defined by four horizontal lines with first and second of said lines being parallel to the center-line of the flow passage immediately prior to said first bend and touching respectively the inner surface of the plate forming said pocket and the inner surface of the other plate defining the passage immediately before said first bend, and with third and fourth of said lines parallel to the center-line of the flow passage immediately after said first bend and touching respectively the inner surface of the plate forming said pocket and the inner surface of the other plate defining the passage immediately after said first bend, and the cross-sectional area of the pocket at said first bend being defined by the inner surface of the plate which forms the pocket at the said first bend and by said first and third lines of said parallelogram which touch the inner surface of the pocket forming plate.

2. A gas scrubbing plant as in claim 1 wherein a constriction in the passage is provided both before and after each bend, the constriction before said first bend having a greater inside width than the constriction before said second bend.

3. A gas scrubbing plant as in claim 2 wherein the constriction after the second bend has a greater inside width than the two preceeding constrictions in the passage.

4. A gas scrubbing plant as in claim 1 wherein said pocket formed in at least a first of said bends has a horizontal cross-sectional area of between 30% and 60% of the area of said parallelogram associated with said bend.

5. A gas scrubbing plant as in claim 1 wherein the angle of the first bend is at least 70° and not greater than 120° and wherein tha angle of the first bend is at least 10° greater than the angle of subsequent bends downstream of it.

6. A gas scrubbing plant as in claim 5 wherein the angle of the first bend is between 15° and 20° greater than the angle of subsequent bends downstream of it.

7. A gas scrubbing plant as in claim 1 which also comprises a spray device positioned between said scrubbing station and said at least one drop trap and feed means for conveying liquid to said spray device, said feed means and said spray device delivering liquid to the gas such that the liquid content thereof is at least 3 g/m$^3$.

8. A drop trap for use in a gas scrubbing plant comprising a plurality of vertical plates extending substantially parallel to one another and defining horizontal gas flow passages therebetween, the plates each having in a horizontal section a zig-zag configuration and each said passage having at least two angled bends therein, the plates being shaped to form a pocket on the outer side of each bend extending on both sides of the corner of the bend and substantially over the entire height of the respective plate;

the plates being positioned prior to each bend such that the passage defined therebetween opens into said pocket for at least partially guiding the gas flow into the associated pocket;

the angle of the first of said bends being greater than the angle of the second of said bends immediately adjacent it, said angles being defined by the juncture of the respective center-lines of the flow passages prior to and after said bends; and the pocket formed in at least a first of said bends in each passage having a horizontal cross-sectional area of at least 8% of the area of a parallelogram associated with said first bend, the parallelogram being defined by four horizontal lines, with first and second of said lines being parallel to the center-line of the flow passage immediately prior to said first bend and touching respectively the inner surface of the plate forming said pocket and the inner surface of the other plate defining the passage immediately before said first bend, and with third and fourth of said lines parallel to the center-line of the flow passage immediately after said first bend and touching respectively the inner surface of the plate forming said pocket and the inner surface of the other plate defining the passage immediately after said first bend, and the cross-sectional area of the pocket at said first bend being defined by the inner surface of the plate which forms the pocket as said first bend and by said first and third horizontal lines of said parallelogram which touch the inner surface of the pocket forming plate.

* * * * *